INVENTOR.
Max Ledinegg
BY
Michael S. Striker
agt.

Nov. 20, 1956 M. LEDINEGG 2,770,947
GAS TURBINE PLANT FOR PULVERIZED FUEL WITH COMBUSTION
CHAMBER SURROUNDED BY AIR COOLING DUCTS
Filed Nov. 16, 1949 2 Sheets-Sheet 2
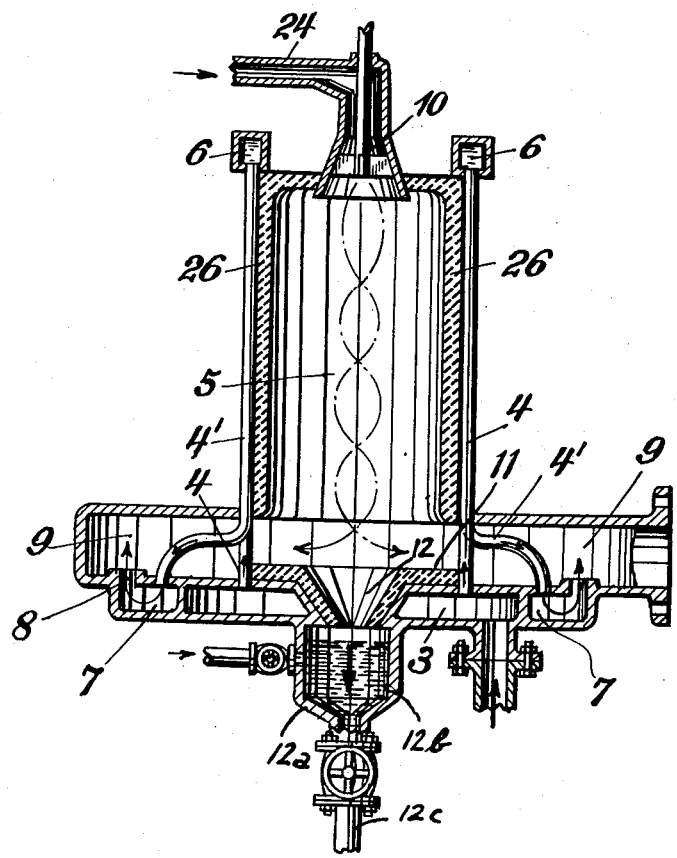
INVENTOR:
Max Ledinegg
BY:
Michael S. Struker
agt.

United States Patent Office 2,770,947
Patented Nov. 20, 1956

2,770,947

GAS TURBINE PLANT FOR PULVERIZED FUEL WITH COMBUSTION CHAMBER SURROUNDED BY AIR COOLING DUCTS

Max Ledinegg, Vienna, Austria, assignor of one-half to Simmering-Graz-Pauker Aktiengesellschaft fur Maschinen-Kessel- und Waggonbau, Vienna, Austria, a company working under the laws of Austria Application November 16, 1949, Serial No. 127,724

Claims priority, application Austria November 26, 1948

3 Claims. (Cl. 60—39.46)

This invention relates to a gas turbine installation suitable for operation with any solid fuel in pulverized form. The combustion chamber is constructed as a smelting chamber, viz from which liquid slag is withdrawn, the operation being carried out with low excess of air and at highest furnace temperature. The walls of the combustion chamber are lined with tubes which are insulated towards the fire.

According to the present invention the air flow is divided after passing through the recuperator. Part of the compressor air is directly guided into the smelting chamber while another part is guided to the cooling pipes enveloping the smelting chamber.

It has also been proposed to use the direct combustion of solid fuels in the form of dust in connection with the open process of a gas turbine but this has the disadvantage that in as far as the working process entails withdrawal of dry slag from the combustion chamber only a small separation of dust, viz of a small percentage, is possible, while in the case of operation with a smelting chamber about 80% of dust can be secured. In the case of dry slag withdrawal, separation could also take place in subsequently arranged filters, but the space required for their accommodation would be very large. Whereas the use of air for cooling the tubing of the walls of the combustion chamber is known in itself, the quantities of heat absorbed by the air is too large, owing to the large dimensions required for the combustion chamber, and lead to excessive heating of the air. In this case it would only be possible to provide combustion chamber walls consisting of steam boilers but this measure would reduce the total efficiency and lead to design difficulties in the case of coal dust firing. The same holds good also in the case of liquid slag withdrawal if evaporated water is to be used for the cooling.

According to the invention the air supplied by the compressor itself is used with great advantage for cooling the walls of the smelting furnace, since the heat absorption by the almost heat insulated tubes of a smelting vessel is small, so that also the heating up of the air when the tubular wall is cooled is small. In carrying the invention into effect the air may flow through the cooling tubes of the combustion chamber, according to the amount of absorbed heat, either directly after leaving the compressor or after passing through waste gas recuperators.

Different examples of construction according to the invention are diagrammatically illustrated in the accompanying drawings, in which:

Fig. 3 is a sectional view of a combustion chamber.

Figure 1:
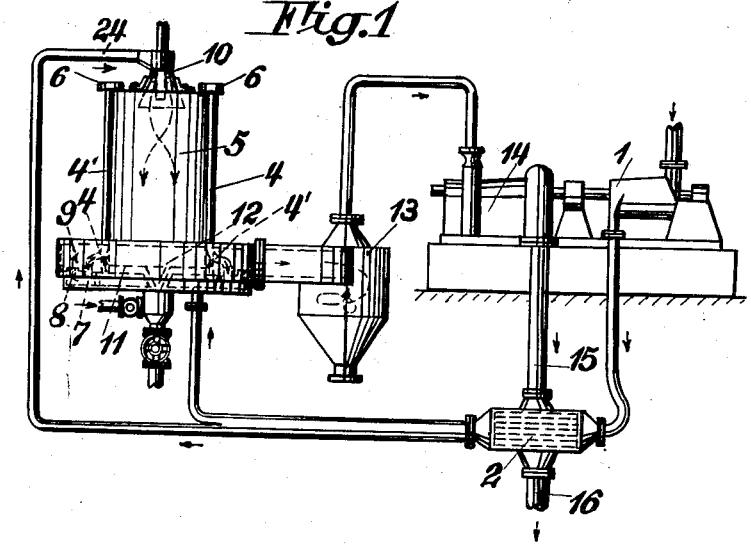
Fig. 1 is a schematic view of a preferred embodiment of the present invention.

Referring to Figure 1, the cooling air is supplied to the smelting chamber only after passing through the waste gas recuperator.

Figure 2:
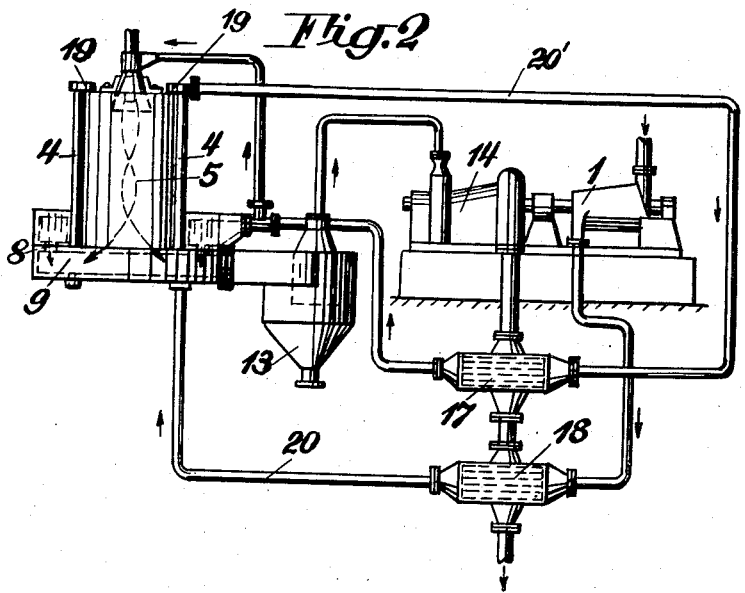
Fig. 2 is a schematic view of another embodiment of the present invention.

In Fig. 2 the waste gas recuperator comprises two stages. The air supplied by the compressor passes first of all through the second stage of the recuperator and thence through the cooling tubes of the combustion chamber, after leaving which the air is led through the first recuperator stage. In this way the air temperature in the cooling tubes of the combustion chamber is lower than in the case of the construction according to Figure 1.

In the construction shown in Fig. 1, 1 is the compressor used in the operation of the gas turbine. The compressed air flows through the recuperator 2 whereupon one part of it is introduced by means of the distributing chamber 3 into the bottom ends of the cooling pipes 4 of the smelting chamber 5. As best seen in Fig. 3, the cooling pipes 4 and 4' are so connected that the air flows in cooling pipe 4 from below upwards and in the adjacent cooling pipe 4' from above downwards. Such deflection and reversal of flow takes place at the top ends of the pipes 4 in the reversing chamber 6. After flowing through the cooling pipes 4' the air reaches the chamber 7. The latter is provided, concentrically with respect to the cylindrical combustion chamber, with nozzles 8, through which the air reaches the annular channel 9, thereby mixing with the flue gases which leave the combustion chamber 5 and cooling the same. The combustion air for the combustion chamber 5 is supplied through the pipe 24 to the coal dust burner 10. The cooling pipes 4, 4' are provided towards the fire in a known manner with a heat insulating material 26 in order to secure working temperatures as high as possible in the chamber 5. The slag runs down the walls of the chamber, it collects at the bottom 11 of the same and is discharged through the slag outlet opening 12. The slag outlet 12 of the combustion chamber 5 is provided in a conventional manner with a closure 12a permitting removal of the slag. As shown in Fig. 3, a water container 12b receives the drops of slag passing through outlet 12 whereby the slag is granulated. Pressure water continuously flows through container 12b entering through a horizontal pipe in direction of the arrow and leaving through outlet pipe 12c so that the granulated slag is continuously removed. After leaving the chamber the flue gases are cooled to the actual working temperature of the installation by means of the air added at 8 in the manner already described. The flue gases now reach a separator 13 where the ash remainder is separated and thence they enter the gas turbine 14. The waste gases are supplied to the exchanger 2 through the pipe 15, finally escaping into the open at 16.

In the construction according to Fig. 2 the recuperator 2 shown in Fig. 1 is provided with two stages, 17 and 18 respectively. The air supplied by the compressor 1 flows first of all through recuperator 18 and thence through the combustion chamber pipes 4. The air from pipes 4 then enters the annular collecting box 19 and flows through pipe 20' to the second recuperation stage 17. The admixture of air to the flue gases leaving the combustion chamber now takes place by means of the nozzles 8, and the flue gases then pass into the separator 13 and the gas turbine 14. The purpose of the arrangement according to the invention as shown in Fig. 2 is that air of lower temperature flows from recuperator 18 through conduit 20 for the cooling of the combustion chamber without preventing the cooling of the waste gases in the recuperators owing to too high temperatures of the air.

The arrangement described thus enables all kinds of coal being rendered useful for gas turbine operation, the combustion taking place as perfectly as possible at the highest temperatures. According to the invention the combustion air itself is used as a cooling medium in the combustion chamber, which means a gain in efficiency with respect to other constructions with other cooling media such as steam and the like.

What I claim is:

1. In a gas turbine plant, in combination, an upright combustion chamber for burning pulverized fuel whereby combustion gases and liquid slag are produced, said combustion chamber including a heat insulating wall means, and having a top portion formed with a fuel inlet and a bottom portion formed with a slag outlet for discharging liquid slag; a plurality of substantially parallel upright pipes located outside of said combustion chamber on said heat insulating wall means and extending between said top and bottom portions of said combustion chamber, said plurality of upright pipes including a first set of pipes and a second set of pipes; reversing chamber means at said top portion of said combustion chamber and communicating with the top ends of said first and second sets of pipes, the bottom ends of said first set of pipes being adapted to receive air as a cooling medium; an annular mixing chamber surrounding said bottom portion of said combustion chamber and communicating therewith so as to receive combustion gases therefrom, said mixing chamber also communicating with the bottom ends of said second set of pipes whereby combustion gases from said combustion chamber and air from pipes are mixed in said mixing chamber, said mixing chamber being formed with an outlet for the mixture of air and combustion gases.

2. In a gas turbine plant, in combination, a turbine including inlet conduit means and a waste gas outlet conduit means; a compressor including an air outlet conduit means; first and second branch air conduit means connected to said outlet conduit means; a heat exchanging recuperator located in said air outlet conduit means intermediate said compressor and said branch air conduit means, said recuperator also communicating with said waste gas outlet conduit means of said turbine for heating the compressor air; a combustion chamber having a bottom portion formed with a slag outlet for discharging liquid slag and a top portion, said combustion chamber including a heat insulating wall means between said top and bottom portions; fuel inlet means for pulverized fuel located at said top portion; air inlet means at said top portion communicating with said first branch air conduit means; pipe means located outside of said combustion chamber on said heat insulating wall means and extending between said top and bottom portions of said combustion chamber, said pipe means including a first set of pipes and a second set of pipes; reversing conduit means at said top portion of said combustion chamber communicating with the top ends of said first and second sets of pipes, the bottom ends of said first set of pipes communicating with said second branch conduit means so that air flows upwards in said first set of pipes and downwards in said second set of pipes; and an annular mixing chamber located at said bottom portion of said combustion chamber and communicating therewith so as to receive combustion gases therefrom, said mixing chamber also communicating with the bottom ends of said second set of pipes whereby combustion gases and air are mixed in said mixing chamber, said mixing chamber having an outlet for the mixture of air and combustion gases communicating with said inlet conduit means of said turbine.

3. A gas turbine plate as set forth in claim 2 and including ash separator means located in said inlet conduit means intermediate said outlet of said mixing chamber and said turbine.

References Cited in the file of this patent

UNITED STATES PATENTS

| | | |
|---|---|---|
| 400,886 | Williams | Apr. 2, 1889 |
| 739,726 | Scott | Sept. 22, 1903 |
| 1,978,837 | Forsling | Oct. 30, 1934 |
| 2,225,310 | Lindhagen | Dec. 17, 1940 |
| 2,380,169 | Gygi | July 10, 1945 |
| 2,399,884 | Noack | May 7, 1946 |
| 2,438,416 | Ruegg | Mar. 23, 1948 |
| 2,500,334 | Zucrow | Mar. 14, 1950 |
| 2,583,920 | Yellott | Jan. 29, 1952 |
| 2,601,390 | Hague | June 24, 1952 |

FOREIGN PATENTS

| | | |
|---|---|---|
| 433,631 | Great Britain | Aug. 19, 1935 |
| 570,522 | Great Britain | July 11, 1945 |
| 603,918 | Great Britain | June 25, 1948 |
| 918,176 | France | Jan. 31, 1947 |